United States Patent Office 3,468,626
Patented Sept. 23, 1969

3,468,626
PREPARATION OF BORIC OXIDE
Dwight L. Sawyer, Boron, Calif., assignor to United States Borax & Chemical Corporation, Los Angeles, Calif., a corporation of Nevada
No Drawing. Filed May 13, 1966, Ser. No. 549,822
Int. Cl. C01b *35/00;* C03c *3/14;* C09k *3/00*
U.S. Cl. 23—149                                                        10 Claims

ABSTRACT OF THE DISCLOSURE

In the preparation of boric oxide by heating at an elevated temperature a feed mixture formed by combining sodium tetraborate pentahydrate with sulfuric acid, the formation of a pasty feed mixture is avoided by use of tetraborate having a particle size smaller than about 100 mesh U.S.S. sieve.

---

This invention relates to the production of boric oxide and, more particularly, it provides an improved process for producing boric oxide directly from alkali metal borates and sulfuric acid.

Boric oxide finds many uses in industry, especially in applications in which a high $B_2O_3$ content material, containing little or no oxides of the alkali or alkaline earth metals, is desired. Thus, the oxide is used in the production of many special glass compositions, enamels, alloys, in the preparation of fluxes, and as a catalyst in organic reactions. However, the price of boric oxide has remained relatively high because of the price of the raw materials as well as the complex processing conditions required for its production. Boric oxide is made commercially by heating boric acid at an elevated temperature over a relatively long period of time. The boric acid starting material is generally obtained by reaction of borax or colemanite with sulfuric acid or hydrochloric acid in an aqueous medium. Therefore, a simple straightforward process for making boric oxide directly from low-cost raw materials is considered to represent a significant advance in the art of inorganic borates.

Copending application Ser. No. 432,652 filed Feb. 15, 1965 by Lloyd L. Fusby, and now abandoned, discloses and claims a novel process for producing vitreous boric oxide directly from metal borates, such as sodium tetraborate, and sulfuric acid. In a preferred embodiment according to this process, concentrated sulfuric acid and sodium tetraborate pentahydrate can be combined in a mixing vessel to provide a feed mixture which is then heated to an elevated temperature of at least about 750° C. to form two molten layers. The upper molten layer is separated and cooled to provide the vitreous boric oxide product. A temperature of about 800° to about 900° C. is generally preferred for forming the two molten layers.

However, in the preparation of the feed mixture, when sulfuric acid and sodium tetraborate pentahydrate are combined, the mixture generally goes through a pasty-like stage during the early to middle state of the mixing process. Generally this pasty material resolidifies in the latter stage of the process. Some types of mixers are unable to handle a pasty stage at all and many other types of mixers can handle the pasty stage only with difficulty. Furthermore, if the feed is discharged from the mixing vessel as a paste, it can resolidify to large lumps and must be reground before feeding to the furnace for heating. Accordingly, it is often desirable to avoid the formation of a pasty stage during the preparation of the sulfuric acid-sodium tetraborate feed mixture.

The present invention provides an improved process for preparing a sodium borate-sulfuric acid feed mixture for subsequent conversion to boric oxide which does not go through a pasty stage during preparation of the mixture. According to the present invention, sodium tetraborate pentahydrate of a particle size of smaller than about 100 mesh U.S.S. sieve is employed as a reactant in the preparation of the feed mixture. When the tetraborate of such particle size and, preferably, of a particle size in the range of from about 100 to about 400 mesh U.S.S. sieve, is combined with about equimolar amounts of sulfuric acid, a granular, dry-appearing, free-flowing feed mixture is obtained without going through a pasty stage. The tetraborate reactant can have some particles larger than 100 mesh, but for best results, a majority such as at least about 80%, should be 100 mesh or smaller.

About equimolar amounts of sulfuric acid and sodium tetraborate are employed in the feed preparation and, preferably, concentrated sulfuric acid of at least about 90% $H_2SO_4$, usually about 93–98% $H_2SO_4$, is used. A slight molar excess of the acid, such as up to about 10%, by weight, can also be employed if desired, and in the preparation of some feed mixtures can be used advantageously. Preferably, the sulfuric acid is sprayed onto the tetraborate particles while intimately mixing the mass. It is also preferred to cool the reaction mass, if necessary, in order to maintain a temperature of less than about 120° C.

The resultant sodium tetraborate-sulfuric acid reaction product mixture is fed to a furnace and heated to an elevated temperature to form two molten layers, such as disclosed in the aforementioned copending application of Lloyd L. Fusby. The upper layer, which is boric oxide, and the lower layer, which is sodium sulfate, are separated and cooled to provide the granular products.

The following examples illustrate the present process but the invention is not to be considered limited to the specific examples given.

EXAMPLE I

Sodium tetraborate pentahydrate (12.904 kg.) was placed in a Sigma mixer. The borate had the following screen analysis:

| U.S. Standard sieve No.: | Cumulative percent retained |
|---|---|
| 50 | 0.3 |
| 70 | 0.4 |
| 100 | 19.8 |
| 140 | 53.3 |
| 200 | 76.9 |
| 270 | 86.2 |
| 400 | 93.5 |
| −400 | 6.5 |

Concentrated sulfuric acid (95%) (4.819 kg.) was then added to the borate by spraying it onto the particles with mixing over a period of about six minutes. The mixture remained granular and free flowing without any evidence of a pasty stage. After about 14 minutes of additional mixing, the feed mixture was discharged to give a free-flowing, granular material.

In a similar experiment, using the same amounts of reactants except the borate was of a larger particle size (90% were larger than 100 mesh), the mixture went through a pasty stage.

EXAMPLE II

Following the procedure of Example I, 5.694 kg. of 95% $H_2SO_4$ were added to 12.904 kg. of sodium tetraborate pentahydrate having the above screen analysis. The acid was added over a period of about 20 minutes and then mixing continued for an additional five minutes to provide a free-flowing, granular material. There was no evidence of a pasty stage during preparation.

The feed mixtures prepared according to the above examples were fed to a furnace and converted to boric oxide and sodium sulfate according to the process disclosed in the aforementioned copending application of Lloyd L. Fusby.

Various changes and modifications of the invention can be made and, to the extent that such variations incorporate the spirit of this invention, they are intended to be included within the scope of the appended claims.

What is claimed is:

1. In the process for preparing boric oxide by combining sulfuric acid with sodium tetraborate pentahydrate to form a feed mixture and heating said feed mixture to an elevated temperature of at least about 750° C. to form two molten layers which are separated to give boric oxide, the improvement which comprises forming said feed mixture with sodium tetraborate pentahydrate having a particle size of smaller than about 100 mesh U.S.S. sieve, thereby giving a non-pasty feed mixture for conversion to boric oxide.

2. The process according to claim 1 wherein at least 80% of said sodium tetraborate pentahydrate has a particle size of smaller than 100 U.S.S. sieve.

3. The process according to claim 1 wherein said sodium tetraborate pentahydrate has a particle size in the range of from about 100 to about 400 U.S.S. sieve.

4. The process according to claim 1 in which the sulfuric acid is concentraed sulfuric acid of about 93–98% $H_2SO_4$.

5. The process according to claim 1 in which up to about 10% excess concentrated sulfuric acid is employed.

6. In the process for preparing boric oxide by reacting about an equimolar amount of concentrated sulfuric acid with sodium tetraborate pentahydrate to form a feed mixture, and heating said feed mixture to an elevated temperature of at least about 750° C. to form two molten layers which are separated to give boric oxide, the improvement which comprises spraying said concentrated sulfuric acid onto said sodium tetraborate pentahydrate, the majority of which has a particle size smaller than about 100 mesh U.S.S. sieve, while mixing the reaction mass and continuing mixing of the reaction mass for a period of time sufficient to give a free-flowing granular feed mixture for conversion to boric oxide.

7. The process according to claim 6 in which at least 80% of said sodium tetraborate pentahydrate has a particle size of smaller than 100 mesh U.S.S. sieve.

8. The process according to claim 6 in which said sodium tetraborate pentahydrate has a particle size in the range of from about 100 to about 400 mesh U.S.S. sieve.

9. The process according to claim 6 in which an excess up to about 10% of sulfuric acid is sprayed onto the said sodium tetraborate pentahydrate.

10. The process according to claim 6 in which said concentrated sulfuric acid is 93–98% $H_2SO_4$.

References Cited

Slavyanskii (1), pp. 1–8 of Translation of Zhurnal Fizicheskoi Khimii, vol. 30, No. 9, 1956, pp. 2046–2050.

Slavyanskii (2), pp. 1–7 of Translation of Zhurnal Fizicheskoi Khimii, vol. 30, No. 10, 1956, pp. 2248–2250.

HERBERT T. CARTER, Primary Examiner

U.S. Cl. X.R.

23—121